United States Patent
Altonen et al.

(10) Patent No.: US 11,673,307 B2
(45) Date of Patent: Jun. 13, 2023

(54) METHODS FOR CONTROLLING CO-INJECTION PLASTIC PRESSURE RATIO BETWEEN INDIVIDUAL FLOW FRONT LAYERS

(71) Applicant: IMFLUX INC., Hamilton, OH (US)

(72) Inventors: Gene Michael Altonen, West Chester, OH (US); Shawn J. Schnee, Liberty Township, OH (US); Aaron Timothy Neate, Liberty Township, OH (US); William Francis Lawless, III, Medford, MA (US)

(73) Assignee: IMFLUX INC., Hamilton, OH (US)

( * ) Notice: Subject to any disclaimer, the term of this patent is extended or adjusted under 35 U.S.C. 154(b) by 0 days.

(21) Appl. No.: 16/854,389

(22) Filed: Apr. 21, 2020

(65) Prior Publication Data

US 2020/0406521 A1    Dec. 31, 2020

Related U.S. Application Data

(60) Provisional application No. 62/866,236, filed on Jun. 25, 2019.

(51) Int. Cl.
*B29C 45/77* (2006.01)
*B29C 45/13* (2006.01)

(52) U.S. Cl.
CPC .............. *B29C 45/77* (2013.01); *B29C 45/13* (2013.01); *B29C 2945/76006* (2013.01); *B29C 2945/76498* (2013.01)

(58) Field of Classification Search
CPC .. B29C 2945/76006; B29C 2945/7618; B29C 2945/76381; B29C 2945/76481; B29C 2945/76498; B29C 2945/76765; B29C 2945/76859; B29C 2945/76933; B29C 2945/76936; B29C 2945/76943; B29C 2945/76946; B29C 2945/76949; B29C 45/13; B29C 45/1615; B29C 45/164; B29C 45/1642; B29C 45/766; B29C 45/77
See application file for complete search history.

(56) References Cited

U.S. PATENT DOCUMENTS

| 9,475,226 | B2 | 10/2016 | Altonen et al. |
| 9,481,119 | B2 | 11/2016 | Altonen et al. |
| 9,643,351 | B2 | 5/2017 | Altonen et al. |
| 9,937,647 | B2 * | 4/2018 | Ward ................... B29C 45/164 |

(Continued)

OTHER PUBLICATIONS

International Application No. PCT/US2020/037683, International Search Report and Written Opinion, dated Aug. 31, 2020.

*Primary Examiner* — Michael M. Robinson
*Assistant Examiner* — Victoria Bartlett
(74) *Attorney, Agent, or Firm* — Marshall, Gerstein & Borun LLP (57) ABSTRACT

A method and system for co-injection molding of two molten plastic materials that allows monitoring and utilization of injection pressure and optionally melt pressure and/or flow front pressure during an injection run. A controller alters the injection pressure so as to achieve and maintain optimal or desired ratios of injection pressure, and optionally melt pressure and/or flow front pressure, of the two molten plastic materials. This allows for more precise part manufacture, including reducing the thickness of a skin or shell layer compared to a core layer of a molded part.

18 Claims, 6 Drawing Sheets

(56) References Cited

U.S. PATENT DOCUMENTS

| | | | |
|---|---|---|---|
| 10,279,525 B2 | 5/2019 | Ward et al. | |
| 2007/0278708 A1* | 12/2007 | Nahill | B29C 45/1643 |
| | | | 264/40.3 |
| 2008/0290543 A1 | 11/2008 | Okamoto et al. | |
| 2012/0217668 A1 | 8/2012 | Catoen et al. | |
| 2013/0221572 A1 | 8/2013 | Berg, Jr. et al. | |
| 2016/0279841 A1* | 9/2016 | Fitzpatrick | B29C 45/60 |
| 2016/0279846 A1 | 9/2016 | Kong et al. | |
| 2016/0297130 A1* | 10/2016 | Esser | B29C 45/2725 |
| 2017/0021544 A1 | 1/2017 | Pollard et al. | |
| 2017/0057145 A1 | 3/2017 | Altonen et al. | |
| 2017/0057148 A1* | 3/2017 | Altonen | B29C 45/16 |
| 2017/0157824 A1 | 6/2017 | Ward et al. | |
| 2017/0182689 A1 | 6/2017 | Berg, Jr. et al. | |
| 2019/0047198 A1* | 2/2019 | Alemany Negrete | B29C 45/78 |
| 2020/0001511 A1 | 1/2020 | Burns et al. | |
| 2020/0078998 A1 | 3/2020 | Lawless, III et al. | |
| 2020/0086542 A1 | 3/2020 | Collins et al. | |

* cited by examiner

$FFP_1 \propto FFP_2$ $FFP_1 \cong FFP_2$ $V_1 \neq V_2$ $HP_1 \neq HP_2$ $MP_1 \neq MP_2$ $HP_1 \cdot IR_1 = MP_1$ $HP_2 \cdot IR_2 = MP_2$ $MP_1 \cdot AF_1 = FFP_1$ $MP_2 \cdot AF_2 = FFP_2$ $MP_1 \cdot AF_1 \propto MP_2 \cdot AF_2$

METHODS FOR CONTROLLING CO-INJECTION PLASTIC PRESSURE RATIO BETWEEN INDIVIDUAL FLOW FRONT LAYERS

CROSS-REFERENCE TO RELATED APPLICATION

This non-provisional application claims the benefit of the filing date of U.S. Provisional Application No. 62/866,236, filed Jun. 25, 2019, the entirety of which is hereby incorporated by reference.

FIELD OF DISCLOSURE

The present disclosure relates generally to injection molding and, more particularly, to approaches for controlling each individual injection unit for a co-injection molding process using a calculated or actual plastic melt pressure in combination with an algorithm to ensure that the ratio of plastic pressures between individual material layers is maintained.

BACKGROUND

Injection molding is a technology commonly used for high-volume manufacturing of parts constructed of thermoplastic materials. During repetitive injection molding processes, a thermoplastic resin, typically in the form of small pellets or beads, is introduced into an injection molding machine which melts the pellets under heat, pressure and shear. In an injection molding cycle, the molten thermoplastic material is forcefully injected into a mold cavity having a particular desired cavity shape. The injected plastic is held under pressure in the mold cavity and is subsequently cooled and removed as a solidified part having a shape closely resembling the cavity shape of the mold. A single mold may have any number of individual cavities which can be connected to a flow channel by a gate that directs the flow of the molten resin into the cavity. A typical injection molding procedure generally includes four basic operations: (1) heating the plastic in the injection molding machine to allow the plastic to flow under pressure; (2) injecting the melted plastic into a mold cavity or cavities defined between two mold halves that have been closed; (3) allowing the plastic to cool and harden in the cavity or cavities while under pressure; and (4) opening the mold halves and ejecting the part from the mold. Upon ejecting the part from the mold, the device that injects the melted plastic into the mold cavity or cavities (e.g., a screw or an auger) enters a recovery phase in which it returns to an original position.

In these systems, a control system controls the injection molding process according to an injection cycle that defines a series of control values for the various components of the injection molding machine. For example, the injection cycle can be driven by a fixed and/or a variable melt pressure profile wherein the controller uses, for example, an estimated melt pressure based on the injection pressure. The injection cycle may also be controlled by a fixed or variable screw velocity profile wherein the control senses the velocity of the injection screw as input for determining the driving speed applied to the material.

The injection molding process may vary depending on the type of injection molding being performed. For example, constant low pressure multi-cavity injection molding systems have been developed that inject the molten plastic material into the mold cavity at a substantially constant low pressure, typically less than 6,000 psi, for a single time period or phase. Other injection molding processes include metal injection molding (MIM), reaction injection molding (RIM), liquid injection molding (LIM), structural foam molding, liquid crystal polymer (LCP) molding, injection-stretch blow molding, multi-injection and co-injection.

Throughout injection of plastic in an injection molding process, the typical proxy that is used by the injection molding machine for melt pressure is an injection pressure. The injection pressure is typically either the hydraulic pressure exerted on the back of an injection piston or the amount of force exerted on a load cell on the back of a screw. A calculation is made to approximate what the actual plastic melt pressure is at the front of the screw during injection by comparing the difference in area between where the force or pressure is being measured and the area of the screw tip that is exerted on the molten thermoplastic material. The calculation that is used depends on whether the machine injection is controlled hydraulically or electrically. Alternatively, an actual Melt Pressure reading can be taken somewhere in front of the injection screw tip for a more accurate indication. This Melt Pressure can either be used to monitor or control the injection.

An injection molding system may be a co-injection molding system. Co-injection molding involves injection of two or more molten plastic materials into a single mold cavity or set of mold cavities. Each of the two or more molten plastic materials are injected using a separate injection unit. The most common type of co-injection molding involves injection two materials. Two material co-injection molding may be intermittent or simultaneous.

An intermittent co-injection molding process begins when a first molten plastic material is injected into a mold cavity or a plurality of mold cavities. After a period of time, the first molten plastic material ceases being injected and a second molten plastic material is injected into the mold cavity. After a further period of time, the second molten plastic material ceases being injected and the first molten plastic material is again injected into the mold cavity. An intermittent co-injection molding process can create a molded part with at least five distinct layers of plastic material, three of which are made up of the first molten plastic material and two of which are made up of the second molten plastic material.

In contrast, a simultaneous, continuous co-injection molding process begins when a first molten plastic material is injected into a mold cavity or a plurality of mold cavities. After a period of time, a second molten plastic material is injected into the mold cavity or cavities, while continuing to inject the first material into the mold cavity or cavities. As of this time, the first molten plastic material and the second molten plastic material are injected into the mold cavity (or cavities) simultaneously. After a further (subsequent) period of time, the second molten plastic material ceases being injected into the cavity (or cavities) and only the first molten plastic material continues to be injected. Such a simultaneous co-injection molding process creates a molded part in which the first molten plastic material creates or defines a skin layer or shell that encapsulates the second molten plastic material.

SUMMARY

Arrangements within the scope of the present disclosure are directed to the control of a co-injection molding process to produce repeatably consistent parts by using a virtual or actual melt pressure in combination with an algorithm to maintain a consistent ratio of melt pressures between the different materials within the part cavity as it is being injected. The use of a pressure transducer at or near a nozzle tip of the injection unit gives a more accurate measurement of what the actual plastic melt pressure compared to an injection pressure being used as a proxy. In other words, control of an injection molding cycle using an injection pressure (such as a hydraulic or electric pressure) will yield varying actual plastic melt pressure whereas control of an injection molding cycle using an actual melt pressure will result in parts of increased quality and consistency.

Specifically, a method for controlling a co-injection molding process based upon a plastic melt pressure and algorithm for each injection unit includes injecting molten thermoplastic materials, either sequentially or concurrently, into a mold cavity during a baseline cycle. The method further includes measuring, using a sensor in or near each injection nozzle, a pressure of the molten thermoplastic material during the baseline cycle, and tracking, by a controller, the measured pressures of the molten thermoplastic materials over time during the baseline cycle. The method includes identifying, by the controller, an optimal actual plastic melt pressure curves over time based on the baseline cycle. The method then includes injecting molten thermoplastic materials into the mold cavity during a subsequent cycle and monitoring, using the sensors in or near the nozzles, the pressure of the molten thermoplastic material during the subsequent cycle. The method then includes adjusting, by the controller, an injection pressure of either injection unit in order to cause the monitored pressure of that molten thermoplastic material during the subsequent cycle to follow the optimal actual plastic melt pressure curve over time for that material.

The method for controlling a co-injection molding process based upon plastic melt pressure and algorithm may also include applying a machine learning algorithm to determine an alteration to an optimal actual plastic melt pressure curve. For example, in some implementations, performance of a plurality of injection cycles is monitored for a plurality of different injection molding machines, mold, and molten materials. This historical data can be used as an input to train the machine learning algorithm to correlate the characteristics of the injection molding machine, mold, and/or molten material, the optimal actual plastic melt pressure curve used with such machines, molds, and/or molten materials, and a measured result (such as part quality), and then implement an alteration to the optimal actual plastic melt pressure curve for such a machine, mold, and/or molten material that will result in an improved measured result.

In the above methods, the melt pressure may be calculated or measured directly. The melt pressure may be calculated based on a measured injection pressure. The injection pressure is typically either the hydraulic pressure exerted on the back of an injection piston or the amount of force exerted on a load cell on the back of a screw. The melt pressure is calculated from the injection pressure by comparing the difference in area between where the force or pressure is being measured and the area of the screw tip that is exerted on the molten thermoplastic material. The calculation that is used depends on whether the machine injection is controlled hydraulically or electrically.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale. For example, the dimensions and/or relative positioning of some of the elements in the figures may be exaggerated relative to other elements to help to improve understanding of various embodiments of the present invention.

DETAILED DESCRIPTION OF THE INVENTION

Figure 1:
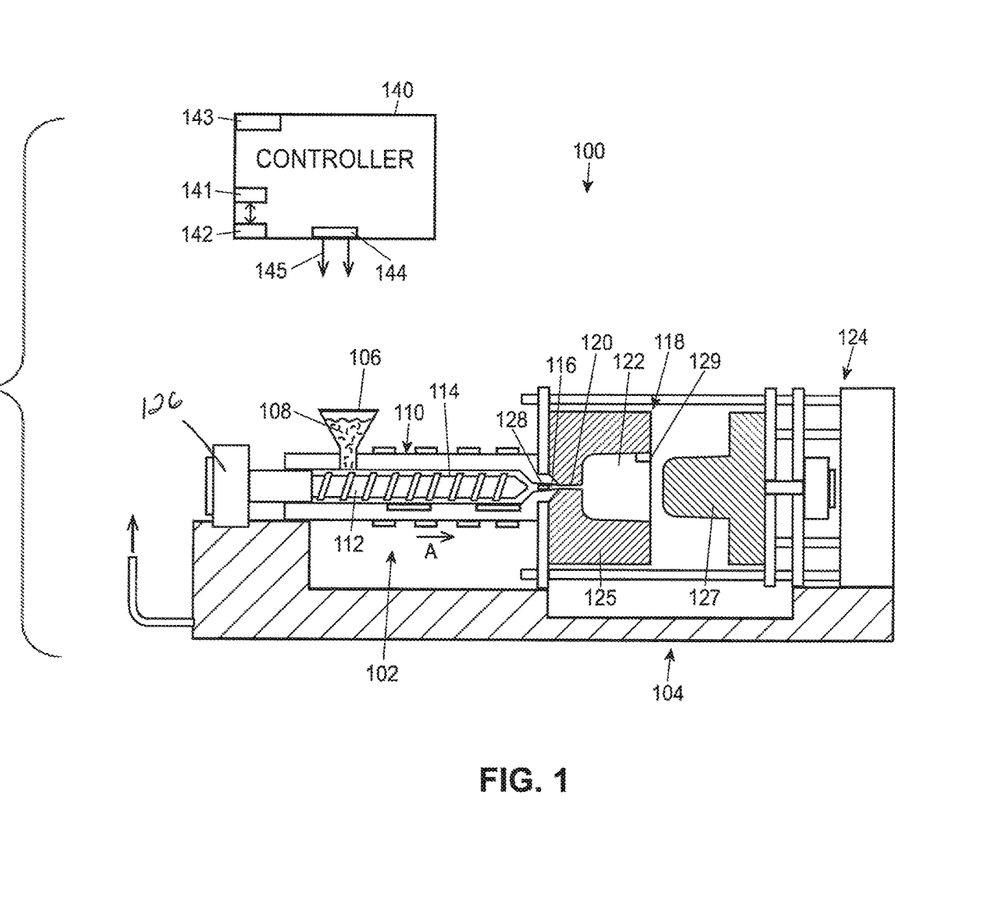
FIG. 1 illustrates a schematic view of an injection molding machine having a controller coupled thereto in accordance with various embodiments of the present disclosure.
Figure 2:
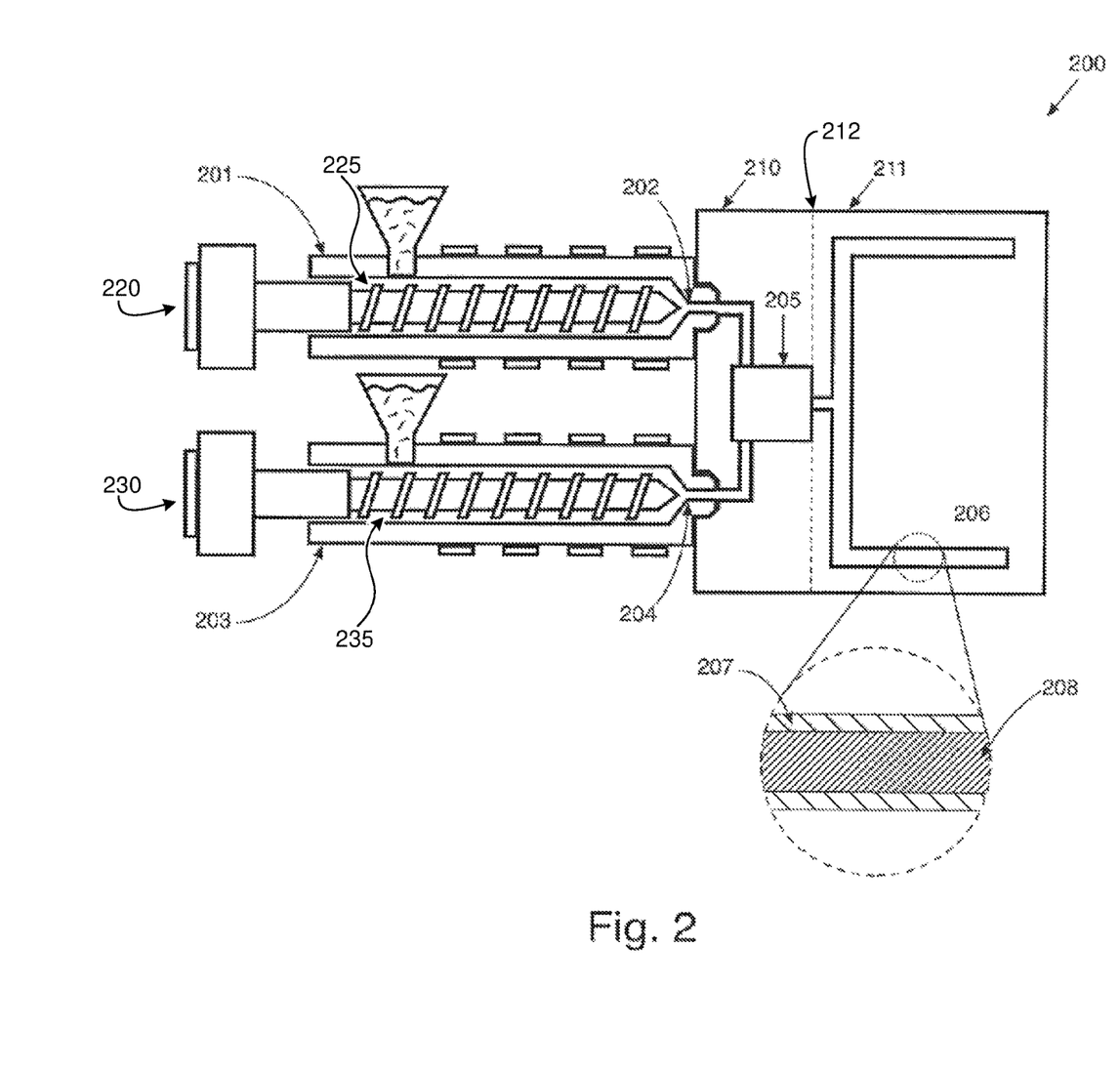
FIG. 2 illustrates a schematic view of a co-injection molding machine having a mold which demonstrates the individual layers within a mold cavity during injection.

Turning to the drawings, an injection molding process is herein described. The approaches described herein may be suitable for electric presses, servo-hydraulic presses, hydraulic presses, and other known machines. As illustrated in FIG. 1, the injection molding machine 100 includes an injection unit 102 and a clamping system 104. FIG. 1 illustrates an injection molding machine 100 with a single injection unit 120. However, injection molding machine 100 can include multiple injection molding units as depicted in FIG. 2. Multiple injection units may make the injection molding unit 100 suitable for co-injection molding.

The injection unit 102 includes a hopper 106 adapted to accept material in the form of pellets 108 or any other suitable form. In many of these examples, the pellets 108 may be a polymer or polymer-based material. Other examples are possible. The hopper 106 feeds the pellets 108 into a heated barrel 110 of the injection unit 102. Upon being fed into the heated barrel 110, the pellets 108 may be driven to the end of the heated barrel 110 by a reciprocating screw 112. The heating of the heated barrel 110 and the compression of the pellets 108 by the reciprocating screw 112 causes the pellets 108 to melt, thereby forming a molten plastic material 114. The molten plastic material 114 is typically processed at a temperature selected within a range of about 130° C. to about 410° C. (with manufacturers of particular polymers typically providing injection molders with recommended temperature ranges for given materials).

The reciprocating screw 112 advances forward from a first position to a second position, in the A direction, and forces the molten plastic material 114 toward a nozzle 116 to form a shot of plastic material that will ultimately be injected into a mold cavity 122 of a mold 118 via one or more gates 120 which direct the flow of the molten plastic material 114 to the mold cavity 122. In other words, the reciprocating screw 112 is driven to exert a force on the molten plastic material 114. In other embodiments, the nozzle 116 may be separated from one or more gates 120 by a feed system (not illustrated). The mold cavity 122 is formed between the first and second mold sides 125, 127 of the mold 118 and the first and second mold sides 125, 127 are held together under pressure via a press or clamping unit 124.

The press or clamping unit 124 applies a predetermined clamping force during the molding process which is greater than the force exerted by the injection pressure acting to separate the two mold halves 125, 127, thereby holding together the first and second mold sides 125, 127 while the molten plastic material 114 is injected into the mold cavity 122. To support these clamping forces, the clamping system 104 may include a mold frame and a mold base, in addition to any other number of components, such as a tie bar.

Once the shot of molten plastic material 114 is injected into the mold cavity 122, the reciprocating screw 112 halts forward movement. The molten plastic material 114 takes the form of the mold cavity 122 and cools inside the mold 118 until the plastic material 114 solidifies. Upon solidifying, the press 124 releases the first and second mold sides 115, 117, which are then separated from one another. The finished part may then be ejected from the mold 118. The mold 118 may include any number of mold cavities 122 to increase overall production rates. The shapes and/or designs of the cavities may be identical, similar to, and/or different from each other. For instance, a family mold may include cavities of related component parts intended to mate or otherwise operate with one another. In some forms, an "injection cycle" is defined as of the steps and functions performed between commencement of injection and ejection. Upon completion of the injection cycle, a recovery profile is commenced during which the reciprocating screw 112 returns to the first position, opposite direction A.

The injection molding machine 100 also includes a controller 140 communicatively coupled with the machine 100 via connection 145. The connection 145 may be any type of wired and/or wireless communications protocol adapted to transmit and/or receive electronic signals. In these examples, the controller 140 is in signal communication with at least one sensor, such as, for example, sensor 128 located in or near the nozzle 116 and/or a sensor 129 located in or near the mold cavity 122. In some examples, the sensor 128 is located at a leading end of the screw 112 and the sensor 129 is located in a manifold or a runner of the injection machine 100. Alternatively, the sensor 128 may be located at any position ahead of the check ring of the screw 112. It is understood that any number of additional real and/or virtual sensors capable of sensing any number of characteristics of the mold 118 and/or the machine 100 may be used and placed at desired locations of the machine 100. As a further example, any type of sensor capable of detecting flow front progression in the mold cavity 122 may be used.

The controller 140 can be disposed in a number of positions with respect to the injection molding machine 100. As examples, the controller 140 can be integral with the machine 100, contained in an enclosure that is mounted on the machine, contained in a separate enclosure that is positioned adjacent or proximate to the machine, or can be positioned remote from the machine. In some embodiments, the controller 140 can partially or fully control functions of the machine via wired and/or wired signal communications as known and/or commonly used in the art.

The sensor 128 may be any type of sensor adapted to measure (either directly or indirectly) one or more characteristics of the molten plastic material 114 and/or portions of the machine 100. The sensor 128 may measure any characteristics of the molten plastic material 114 that are known and used in the art, such as, for example, a back pressure, temperature, viscosity, flow rate, hardness, strain, optical characteristics such as translucency, color, light refraction, and/or light reflection, or any one or more of any number of additional characteristics which are indicative of these. The sensor 128 may or may not be in direct contact with the molten plastic material 114. In some examples, the sensor 128 may be adapted to measure any number of characteristics of the injection molding machine 100 and not just those characteristics pertaining to the molten plastic material 114. As an example, the sensor 128 may be a pressure transducer that measures a melt pressure (during the injection cycle) and/or a back pressure (during the extrusion profile and/or recovery profile) of the molten plastic material 114 at the nozzle 116.

As previously noted, the sensor 128 may measure a back pressure exerted on the screw 112, but unlike in conventional systems where back pressure is measured on a trailing end of the screw 112, in the present approaches, back pressure is measured on a leading end of the screw 112. This positioning allows the sensor 128 to accurately measure the compressive pressure on the molten plastic material 114 as compared to measurements obtained at the trailing end of the screw 112 due to the compressible nature of the molten plastic material 114, draw in the barrel, and other factors. Although there are many options for the purchasing the type of sensor 128 that is used, there are no known machines that incorporate this sensor location for injection or back pressure control.

The sensor 128 generates a signal which is transmitted to an input of the controller 140. If the sensor 128 is not located within the nozzle 116, the controller 140 can be set, configured, and/or programmed with logic, commands, and/or executable program instructions to provide appropriate correction factors to estimate or calculate values for the measured characteristic in the nozzle 116. For example, as previously noted, the sensor 128 may be programmed to measure a back pressure during a recovery profile. The controller 140 may receive these measurements and may translate the measurements to other characteristics of the molten plastic material 114, such as a viscosity value.

Similarly, the sensor 129 may be any type of sensor adapted to measure (either directly or indirectly) one or more characteristics of the molten plastic material 114 to detect its presence and/or condition in the mold cavity 122. In various embodiments, the sensor 129 may be located at or near an end-of-fill position in the mold cavity 122. The sensor 129 may measure any number of characteristics of the molten plastic material 114 and/or the mold cavity 122 that are known in the art, such as pressure, temperature, viscosity, flow rate, hardness, strain, optical characteristics such as translucency, color, light refraction, and/or light reflection, and the like, or any one or more of any number of additional characteristics indicative of these. The sensor 129 may or may not be in direct contact with the molten plastic material 114. As an example, the sensor 129 may be a pressure transducer that measures a cavity pressure of the molten plastic material 114 within the cavity 122. The sensor 129 generates a signal which is transmitted to an input of the controller 140. Any number of additional sensors may be used to sense and/or measure operating parameters.

The controller 140 is also in signal communication with a screw control 126. In some embodiments, the controller 140 generates a signal which is transmitted from an output of the controller 140 to the screw control 126. The controller 140 can control any number of characteristics of the machine, such as injection pressures (by controlling the screw control 126 to advance the screw 112 at a rate which maintains a desired value corresponding to the molten plastic material 114 in the nozzle 116), barrel temperatures, clamp closing and/or opening speeds, cooling time, inject forward time, overall cycle time, pressure set points, ejection time, screw recovery speed, back pressure values exerted on the screw 112, and screw velocity.

The signal or signals from the controller 140 may generally be used to control operation of the molding process such that variations in material viscosity, mold temperatures, melt temperatures, and other variations influencing filling rate are taken into account by the controller 140. Alternatively or additionally, the controller 140 may make necessary adjustments in order to control for material characteristics such as volume and/or viscosity. Adjustments may be made by the controller 140 in real time or in near-real time (that is, with a minimal delay between sensors 128, 129 sensing values and changes being made to the process), or corrections can be made in subsequent cycles. Furthermore, several signals derived from any number of individual cycles may be used as a basis for making adjustments to the molding process. The controller 140 may be connected to the sensors 128, 129, the screw control 126, and or any other components in the machine 100 via any type of signal communication approach known in the art.

The controller 140 includes software 141 adapted to control its operation, any number of hardware elements 142 (such as, for example, a non-transitory memory module and/or processors), any number of inputs 143, any number of outputs 144, and any number of connections 145. The software 141 may be loaded directly onto a non-transitory memory module of the controller 140 in the form of a non-transitory computer readable medium, or may alternatively be located remotely from the controller 140 and be in communication with the controller 140 via any number of controlling approaches. The software 141 includes logic, commands, and/or executable program instructions which may contain logic and/or commands for controlling the injection molding machine 100 according to a mold cycle. The software 141 may or may not include an operating system, an operating environment, an application environment, and/or a user interface.

The hardware 142 uses the inputs 143 to receive signals, data, and information from the injection molding machine being controlled by the controller 140. The hardware 142 uses the outputs 144 to send signals, data, and/or other information to the injection molding machine. The connection 145 represents a pathway through which signals, data, and information can be transmitted between the controller 140 and its injection molding machine 100. In various embodiments this pathway may be a physical connection or a non-physical communication link that works analogous to a physical connection, direct or indirect, configured in any way described herein or known in the art. In various embodiments, the controller 140 can be configured in any additional or alternate way known in the art.

The connection 145 represents a pathway through which signals, data, and information can be transmitted between the controller 140 and the injection molding machine 100. In various embodiments, these pathways may be physical connections or non-physical communication links that work analogously to either direct or indirect physical connections configured in any way described herein or known in the art. In various embodiments, the controller 140 can be configured in any additional or alternate way known in the art.

FIG. 2 depicts an injection molding machine 200 having two injection units. Injection molding machine 200 may operate similarly to injection molding machine 100 of FIG. 1 and each injection unit may operate similarly to injection unit 102 of FIG. 1. Each injection unit of injection molding machine 200 may have multiple sensors. For example, upper injection unit 220 may have sensors 201 and 202 and lower injection unit 230 may have sensors 203 and 204. The injection molding machine 200 may also have a runner system 205, a first mold side 210, and second mold side 211 which forms a mold cavity 206. The first mold side 210 and second mold side 211 may form a mold 212 with a single mold cavity 206 or multiple mold cavities.

Sensor 201 of upper injection unit 220 may measure the injection pressure associated with the screw of upper injection unit 220. The injection pressure is typically either the hydraulic pressure exerted on the back of an injection piston or the amount of force exerted on a load cell on the back of a screw. A melt pressure of molten plastic material may be calculated from the injection pressure by comparing the difference in area between where the force or pressure is being measured and the area of the screw tip that is exerted on the molten plastic material. The calculation that is used depends on whether the machine injection is controlled hydraulically or electrically. Similarly, sensor 203 of lower injection 230 unit may measure the injection pressure associated with the screw of lower injection unit 230.

Sensor 202 of upper injection unit 220 may measure melt pressure associated with upper injection unit 220. The sensor may be located in or near the injection nozzle of upper injection unit. Similarly, sensor 204 of lower injection unit 230 may measure the melt pressure associated with the screw of lower injection unit 230.

Mold 212 may include one or more sensors such as sensor 129 of FIG. 1 to measure the flow front pressure within mold cavity 206. Such a sensor or sensors may measure flow front pressure of a first molten plastic material injected by one of the injection units and flow front pressure of a second molten plastic material injected by the other of the injection units.

Runner system 205 may include the path traveled by the molten plastic material from the injection nozzle of upper injection unit 220 to mold cavity 206 and the path traveled by the molten plastic material from the injection nozzle of lower injection unit 230 to the mold cavity 206. Runner system 205 may be a hot runner system or a cold runner system. Runner system 205 may feed a single mold cavity 206 or multiple mold cavities.

Upper injection 220 unit may inject a first molten polymeric material and lower injection unit 230 may inject a second molten polymeric material. The co-injection machine 200 may be a simultaneous co-injection machine such that upper injection unit 220 injects the first molten polymeric material to form a skin layer 207 around a core layer 208 formed by the second molten polymeric material. The first molten polymeric material and/or the second molten polymeric material may be, or at least include a substantial percentage of, a regrind material. While the use of regrind material is beneficial from the standpoint of supply cost savings and waste mitigation, various properties of regrind material are considered detrimental, at least in certain industries, and as such, the use of regrind material on exposed surfaces of molded products is often limited. As such, a co-injection system that facilitates the use of regrind material as at least a substantial percentage of the second molten polymeric material, which becomes a core layer to a skin layer of entirely, or at least substantially, virgin polymeric material, would be beneficial as it would permit the economical manufacture of molded parts with substantial regrind material, while avoiding the detrimental effects of regrind material at exposed surfaces of the molded parts. A system that could control the flow front pressure ratio of the first and second molten polymeric materials (as described in more detail below), so as to maximize the relative thickness of the second polymeric material (as compared to the thickness of the first polymeric material) along the entire length of the molded part where both the first and second molten polymeric materials are present, advantageously maximizes the use of regrind material in the resulting molded part.

Similarly, porous materials (which may or may not include significant percentages of regrind material) may not be suitable for use as an exposed layer (i.e., as a skin layer or shell) of certain types of molded products, such as food packaging products, consumer electronic housings or cosmetics, because porous materials might permit unacceptable levels of bacterial growth or be otherwise visually unappealing. Provided a suitable flow front pressure ratio is maintained between the thickness of a non-porous skin layer or shell, and the thickness of a core layer made of a porous material, use of porous materials in molded products for which porous materials were conventionally contraindicated could be accomplished. This may provide substantial supply cost savings, result in lighter molded parts that reduce ultimate product shipping cost, or provide other advantages, such as thermal insulation or sound dampening.

Alternatively, barrier materials which are suitable for limiting gas or light permeation may be very expensive and only need to be used in a small percentage (i.e 1-5%) as a core layer. Provided a suitable flow front pressure ratio is controlled to maintain the proper ratio between the thickness of the skin layer and the barrier core layer, efficient use of the expensive core material can be managed so that neither too much is used which would otherwise increase cost nor too little is used which would otherwise cause the barrier material to be ineffective.

The molded part with the skin layer 207 and the core layer 208 may be formed by injecting the first molten plastic material into mold cavity 206. In response to a certain condition, a second molten plastic material may be injected such that the first molten plastic material and the second molten plastic material are injected into mold cavity 206 simultaneously. Then, in response to another certain condition, the injection of the second molten plastic material may be ceased while the first molten plastic material injection is continued to be injected into mold cavity 206. The certain condition or the another certain condition may be the completion of a desired period of time, the attainment of a desired flow front position setpoint of the skin layer 207, the attainment of a desired cavity melt pressure (directly or indirectly measured) threshold of the skin layer 207, the attainment of a desired screw 225 position of the skin layer 207, and/or the attainment of a desired screw 225 travel of the skin layer 207. An indirect measurement of a desired cavity melt pressure may be a strain measurement achieved using microwave sensor kits, x-ray sensor kits, ultrasonic sensor kits, air pressure sensor kits, air temperature sensor kits, and/or sub-surface temperature sensor kits. Similarly, lower injection unit 230 may inject molten plastic material to form the skin layer 207 and upper injection unit 220 may inject molten plastic material to form the core layer 208.

A controller of injection unit 200 such as controller 140 of FIG. 1 may control the injection pressure of upper injection unit 220 and the injection pressure of lower injection unit 230. The controller may modify the injection pressure of either injection unit based on a desired injection pressure of the injection unit, a melt pressure of the molten plastic material of the injection unit, and/or a flow front pressure associated with the molten plastic material of the injection unit.

Figure 3:
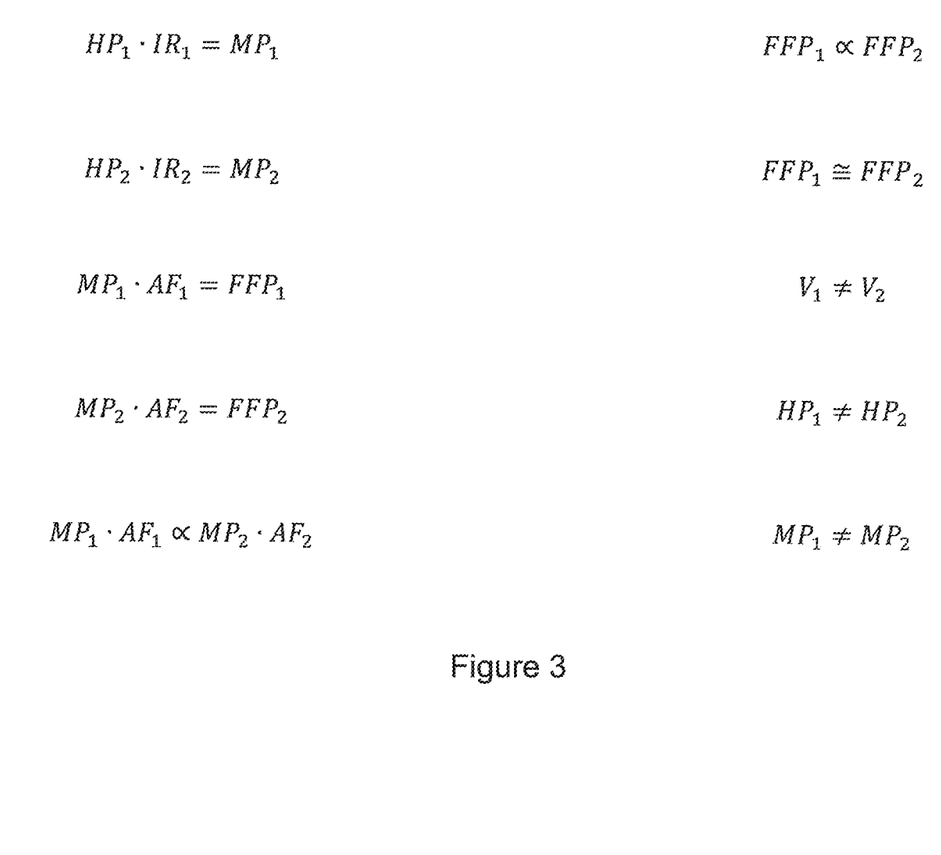
FIG. 3 illustrates equations that are applicable to the general algorithm that will be used for maintaining plastic pressure ratio between individual layers of flow.

The relationship between hydraulic pressure, melt pressure, and flow front pressure corresponding to an injection unit and the molten plastic material injection by the injection unit is described in FIG. 3. The thickness of each layer of a co-injection molded part may be a function of the flow front pressures of each molten plastic material forming the molded part.

Hydraulic pressure is the hydraulic pressure exerted on the back of an injection piston In an electrical system, hydraulic pressure may be substituted with the amount of force exerted on a load cell on the back of a screw. The hydraulic pressure ($HP_1$) of a first injection unit of a co-injection molding machine, such as upper injection unit 220 of co-injection molding machine 200 may be combined with the intensification ratio ($IR_1$) of the screw of the first injection unit to determine the melt pressure ($MP_1$) of the molten plastic material injected from the first injection unit. The intensification ratio ($IR_1$) may be determined by comparing the difference in area between where the hydraulic pressure is being measured and the area of the screw tip that is exerted on the molten thermoplastic material. The hydraulic pressure ($HP_1$) may be measured directly such as by sensor 201. The determination of the melt pressure ($MP_1$) from the hydraulic pressure ($HP_1$) and the intensification ratio ($IR_1$) may also depend on other factors such as other properties of the screw of the injection molding unit or the viscosity of the injected molten plastic material. Similarly, the hydraulic pressure ($HP_2$) of a second injection unit of a co-injection molding machine, such as lower injection unit 230 of co-injection molding machine 200 may be combined with the intensification ratio ($IR_2$) of the screw of the second injection unit to determine the melt pressure ($MP_2$) of the molten plastic material injected from the second injection unit.

The melt pressure ($MP_1$) of a first injection unit of a co-injection molding machine, such as upper injection unit 220 of co-injection molding machine 200 may be combined with an A factor ($AF_1$) of the co-injection molding system to determine the flow front pressure ($FFP_1$) of the molten plastic material injected from the first injection unit as the molten plastic material flows through the mold cavity such as mold cavity 206 of mold 211. The melt pressure ($MP_1$) may be measured directly such as by using sensor 202 or the melt pressure ($MP_1$) may be calculated such as by using the above equation.

The A factor ($AF_1$) may depend on the properties of the runner system through which the molten plastic material from the first injection unit flows on its way to the mold cavity, such as runner system 205. The A factor ($AF_1$) may also depend on the viscosity of the molten plastic material injected from the first injection unit. The A factor ($AF_1$) may remain stable during a single shot of molten plastic material or change during the course of the shot. The A factor ($AF_1$) may also change from a first shot to a second shot. For example, the A factor ($AF_1$) may change as an injection molding machine warms up from use. The A factor ($AF_1$)

may be calculated a priori from properties of the runner system such as the number of turns in a runner system, the diameter of flow tubes in the runner system, the length of flow tubes in runner system, and the number of cavities the runner system feeds. The A factor ($AF_1$) may also be calculated a priori from the properties of the molten plastic material injected from the first injection unit such as the temperature of the molten plastic material and the viscosity of the molten plastic material. The A factor ($AF_1$) may be experimentally determined, and even updated, as more multiple parts are molded and analyzed.

Similarly, the melt pressure ($MP_2$) of a second injection unit of a co-injection molding machine, such as lower injection unit 230 of co-injection molding machine 200 may be combined with an A factor ($AF_2$) of the co-injection molding system to determine the flow front pressure ($FFP_2$) of the molten plastic material injected from the second injection unit as the molten plastic material flows through the mold cavity such as mold cavity 206 of mold 212.

The melt pressure ($MP_1$) of a first injection unit such as upper injection unit of co-injection molding system 200 combined with the A factor ($AF_1$) of the portion of the runner system 205 corresponding the molten plastic material injected from the first injection unit may be proportional to the melt pressure ($MP_2$) of a second injection unit such as lower injection unit 230 of co-injection molding system 200 combined with the A factor ($AF_2$) of the portion of the runner system 205 corresponding the molten plastic material injected from the second injection unit. Following from this relationship, the flow front pressure ($FFP_1$) of the molten plastic material injected by the first injection unit may be proportional to the flow front pressure ($FFP_2$) of the molten plastic material injected by the second injection unit. Additionally, the flow front pressure ($FFP_1$) of the molten plastic material injected by the first injection unit and the flow front pressure ($FFP_2$) of the molten plastic material injected by the second injection unit may be roughly equal.

Additionally, the viscosity ($V_1$) of the material injected by the first injection unit may be different from the viscosity ($V_2$) of the material injected by the second injection unit. The hydraulic pressure ($HP_1$) applied to the first injection unit may be different from the hydraulic pressure ($HP_2$) applied to the second injection unit. Additionally, the melt pressure ($MP_1$) at the first injection unit may be different from the melt pressure ($MP_2$) of the second injection unit.

Figure 4:
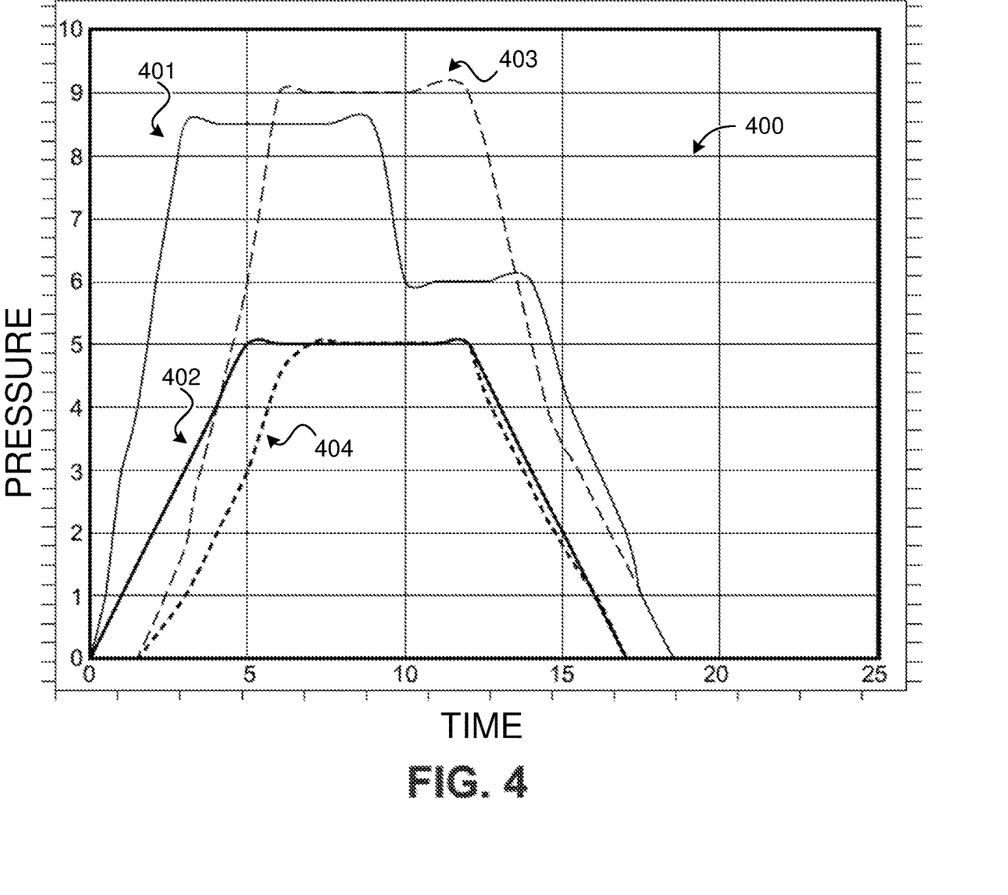
FIG. 4 illustrates an exemplary profile for actual or virtual plastic melt pressure within the injection unit compared to plastic pressure for each individual layer where the plastic pressure ratio between individual layers of flow is equal to 1.

FIG. 4 describes an exemplary profile 400 depicting actual or calculated melt pressure target setpoints 401 and 403 for each injection unit and flow front pressures 402 and 404 for each individual molten plastic material layer. The plastic pressure ratio between individual layers of flow is equal to 1. The first molten plastic material is injected and the actual or calculated melt pressure ($MP_1$) 401 is used as a target setpoint. Based on the material properties and feed system configuration, a time or position based variable Adjustment Factor ($AF_1$) is used to indicate the Plastic Flow Front Pressure 402. Similarly, once a trigger (e.g. a desired time, a desired pressure, or a desired position) has been reached, the second molten material is injected and the actual or calculated melt pressure ($MP_2$) 403 is used as a target setpoint. Based on the material properties and feed system configuration, a time or position based variable Adjustment Factor ($AF_2$) is used to indicate the Plastic Flow Front Pressure 404. The first melt pressure ($MP_1$) 401 and second melt pressure ($MP_2$) 403 will change to maintain the resulting reference curves for the first flow front pressure 402 and the second flow front pressure 404. Alternatively, a sensor may be used in a mold cavity such as mold cavity 206 to determine actual flow front pressures 402 and 404. A sensor may allow direct control of the injection for either or both of the injection units. In the absence of a sensor in the cavity, a proxy sensor such as a strain gauge may be used. A machine hydraulic pressure or load cell may also be used as a proxy for plastic melt pressure 401 and 403 for either or both of the injection units.

Figure 5:
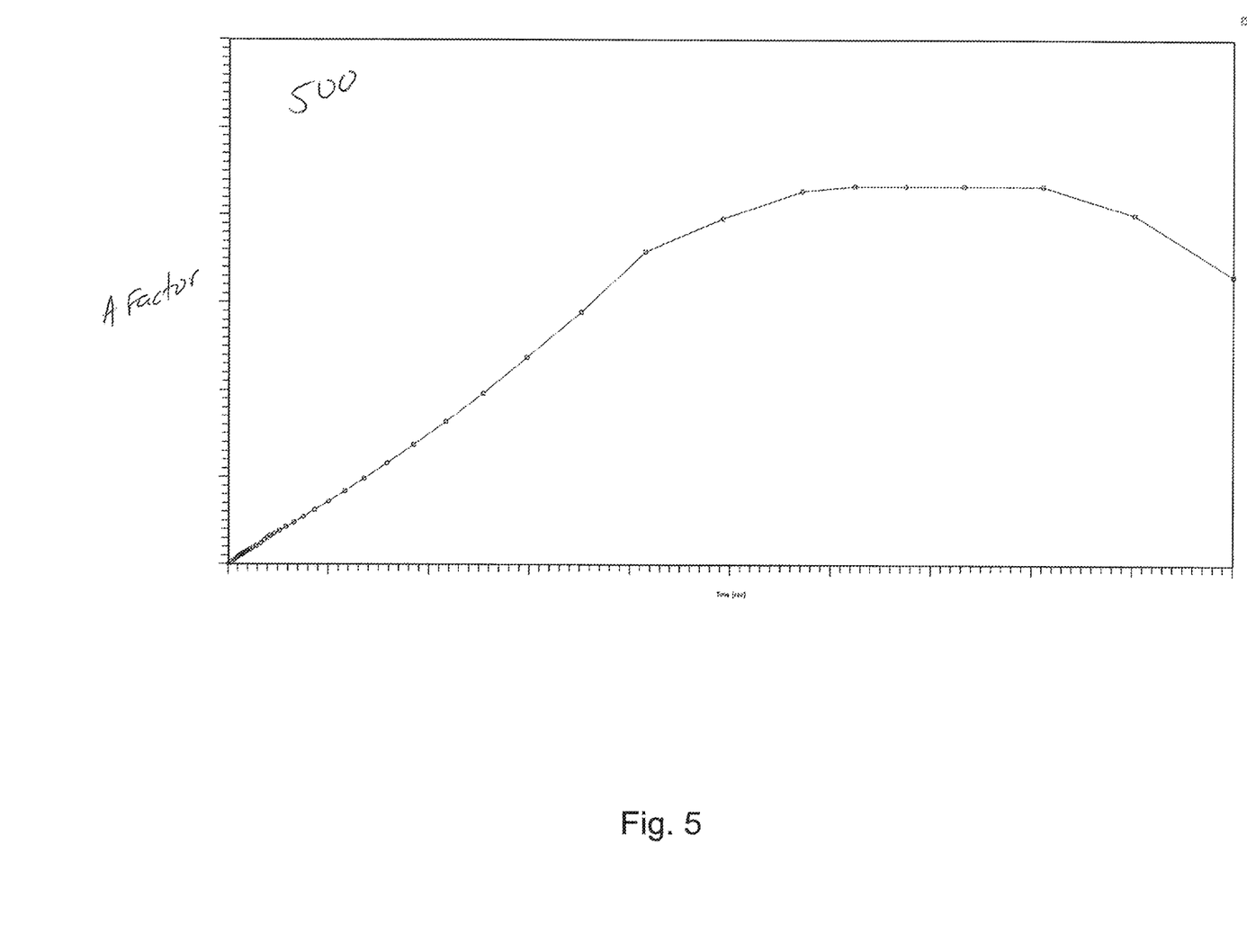
FIG. 5 illustrates an exemplary profile of the change in an Adjustment Factor in algorithm changes during injection.

FIG. 5 depicts a plot 500 of the value of an exemplary A factor during a single shot. As illustrated in FIG. 5, the value of the A factor changes over time during a single injection shot. To maintain a desired flow front pressure resulting in a desired thickness of the skin or core layer of the molded part a controller of the co-injection molding machine, such as controller 140 of injection molding machine 100 may adjust the injection pressure such as the hydraulic pressure exerted on the back of an injection piston or the amount of force exerted on a load cell on the back of a screw to in turn change the melt pressure in response to the changing A factor.

Figure 6:
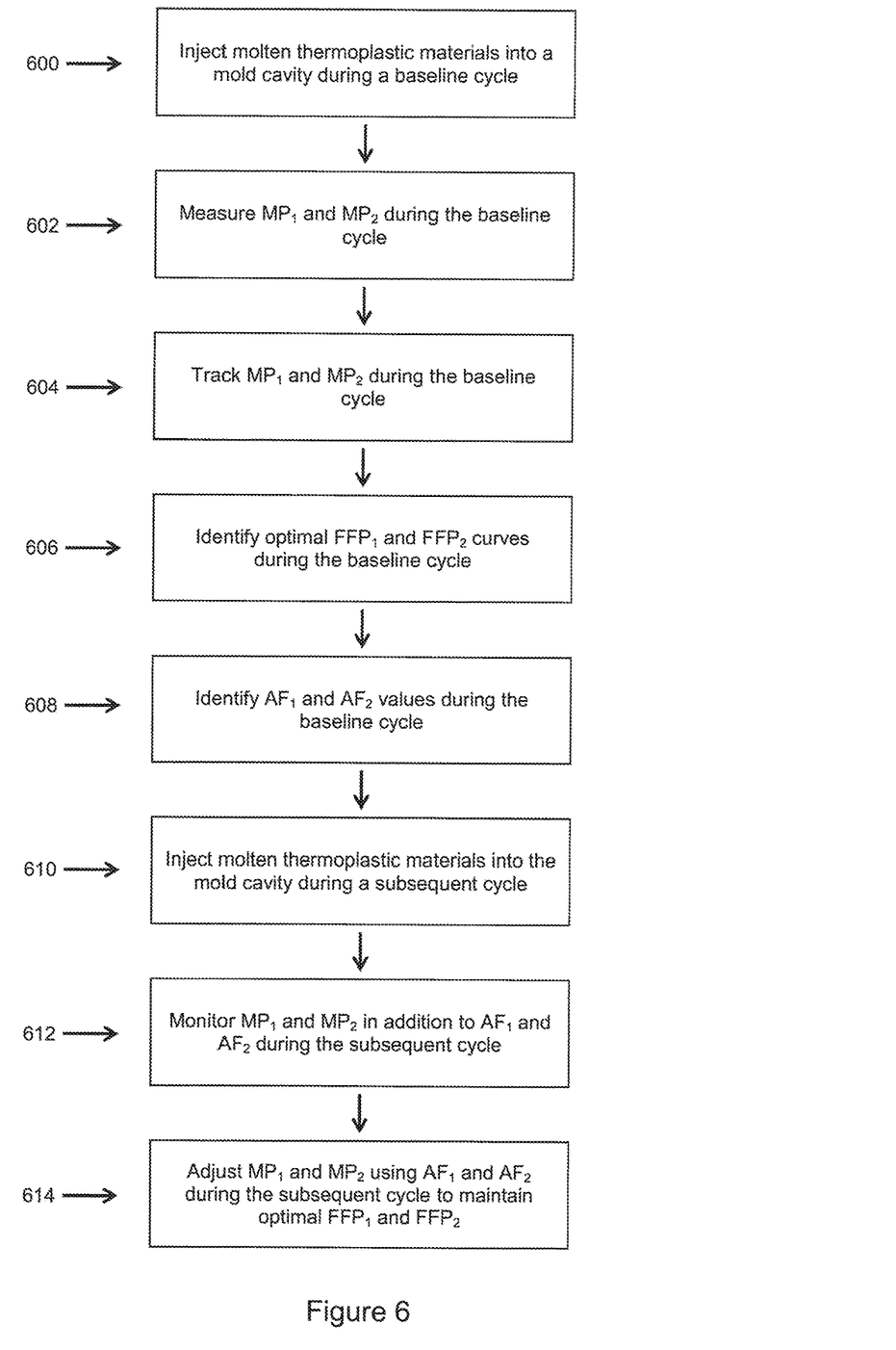
FIG. 6 illustrates an exemplary method for controlling a co-injection molding process based upon an actual or virtual plastic melt pressure and algorithm to maintain the ratio of plastic pressures between individual material layers.

FIG. 6 depicts an example flow diagram of a method for controlling a co-injection molding process to maintain a ratio of flow front pressures between two materials. The method of FIG. 6 may be performed by a controller of an injection molding system, such as controller 140 of injection molding system 100. The injection molding system may be a co-injection molding system, such as co-injection molding system 200.

At step 600, the controller injects molten thermoplastic materials into a mold cavity during a baseline cycle. The controller may first inject a first molten plastic material from a first injection unit into a mold cavity, such as mold cavity 206. After a period of time, the controller may inject a second molten plastic material from a second injection unit into the mold cavity such that the first molten plastic material and the second molten plastic material are injected into the mold cavity simultaneously. After a second period of time, the controller may cease injection of the second molten plastic material and continue to inject only the first molten plastic material into the mold cavity.

Rather than wait a period of time between actions, the controller may perform an action if a variable is approximately equal to a threshold value. The variable may advantageously not be time dependent. For example, the controller may begin injecting the second molten plastic material if the melt pressure of the first molten plastic material reaches a certain threshold value. Having an actual melt pressure reading inside the cavity may be the most accurate method of initiation or termination of actions, but may not be feasible due to either cost or the inability to have visual evidence of an internal cavity sensor on the surface of the finished molded part. Alternatively, a virtual cavity melt pressure sensor such a strain gage may be used an option which is not as costly and does not leave markings on the finished molded part. Alternatively, a flow front position setpoint of the skin layer 207, a flow front position setpoint of the core layer 208, a screw 225 position of the skin layer 207, screw 225 travel distance of the skin layer 207, a screw 235 position of the core layer 208, or screw 235 travel distance of the core layer are other non-time dependent variables which may be used with higher accuracy than time alone to initiate or terminate actions. Alternately, a controller may perform an action based on an actual or virtual melt pressure 202 of a first molten plastic material 207, an actual or virtual melt pressure 204 of a second molten plastic material 208, or ratio of a melt pressure of a first molten plastic material and a second molten plastic material being approximately equal to a threshold value.

At step 602, the controller measures a melt pressure ($MP_1$) of the first injection unit and a melt pressure ($MP_2$) of the second injection unit during a baseline cycle. The melt pressures may be measured directly such as by sensors 202 and 204 or the melt pressures may be calculated from the hydraulic pressure and the intensification ratio. The hydraulic pressures may be measured by sensors 201 and 203.

At step 604, the controller may track the melt pressure ($MP_1$) of the first injection unit and the melt pressure ($MP_2$) of the second injection unit during the baseline cycle. Again, the controller may track the melt pressures by measuring them directly or the controller may track the melt pressured by measuring the hydraulic pressure. Based on tracking the melt pressures the controller may determine the flow front pressures of the first material and the second material. Alternatively, the controller may determine the flow front pressures by measuring the flow front pressures directly.

At step 606, the controller may identify optimal curves for flow front pressure ($FFP_1$) for a molten plastic material injected from a first injection unit and flow front pressure ($FFP_2$) for a molten plastic material injected from a second injection unit. The optimal flow front pressure for the molten plastic material injected from the first injection unit may vary over time during a single injection shot. As a result the optimal flow front pressure may have a first value at a first point in time during the shot and a second value at a second point in time during the shot. Additionally, the desired thickness of the layers of a molded part may determine the optimal flow front pressure. Similarly, the optimal flow front pressure for the molten plastic material injected from the second injection unit may vary over time.

At step 608, the controller may identify an A factor ($AF_1$) corresponding to a molten plastic material injected from a first injection unit and an A factor ($AF_2$) corresponding to a molten plastic material injected from a second injection unit. The A factor may depend on the properties of the runner system through which the molten plastic material from the first injection unit flows on its way to the mold cavity, such as runner system 205. The A factor may be determined based on properties of the runner system, such as runner system 205. The A factor may be experimentally determined. The A factor may depend on the viscosity of the molten plastic material injected from the first injection unit. The A factor may remain stable during a single shot of molten plastic material or change during the course of the shot. The A factor may also change from a first shot to a second shot. For example, the A factor may change as an injection molding machine warms up from use. The A factor may be calculated a priori from properties of the runner system such as the number of turns in a runner system, the diameter of flow tubes in the runner system, the length of flow tubes in runner system, and the number of cavities the runner system feeds. The A factor may also be calculated a priori from the properties of the molten plastic material injected from the first injection unit such as the temperature of the molten plastic material and the viscosity of the molten plastic material. The A factor may be experimentally determined as more multiple parts are molded and studied.

At step 610, the controller may begin a subsequent cycle during which the controller may inject molten thermoplastic materials into the mold cavity. Again, the controller may first inject a first molten plastic material from a first injection unit into a mold cavity, such as mold cavity 206. After a period of time, the controller may inject a second molten plastic material from a second injection unit into the mold cavity such that the first molten plastic material and the second molten plastic material are injected into the mold cavity simultaneously. After a second period of time, the controller may cease injection of the second molten plastic material and continue to inject only the first molten plastic material into the mold cavity.

The controller may inject the first molten plastic material at a first injection pressure and the second molten plastic material at a second injection pressure. The controller may inject the first material at the first injection pressure based on the identified optimal flow front pressure. Similarly, the controller may inject the second material at the second injection pressure based on the identified optimal flow front pressure.

At step 612, the controller may monitor the melt pressure ($MP_1$) of the first injection unit and the melt pressure ($MP_2$) of the second injection unit in addition to the A factor ($AF_1$) corresponding to a molten plastic material injected from a first injection unit and the A factor ($AF_2$) corresponding to a molten plastic material injected from a second injection unit, during the subsequent cycle. Based on the melt pressure and the A factor, the controller may determine a flow front pressure.

At step 614, the controller may adjust the melt pressure ($MP_1$) of the first injection unit and the melt pressure ($MP_2$) of the second injection unit based on the A factor ($AF_1$) corresponding to a molten plastic material injected from a first injection unit and the A factor ($AF_2$) corresponding to a molten plastic material injected from a second injection unit such that the optimal flow front pressure is maintained for the molten plastic material injected from a first injection unit and the molten plastic material injected from the second injection unit. The controller may calculate an actual flow front pressure and compare the actual flow front pressure to an optimal flow front pressure. The controller may adjust a melt pressure by adjusting the injection pressures, such as the hydraulic pressure.

While various embodiments have been described herein, it will be understood that modifications may be made thereto that are still considered within the scope of the appended claims.

What is claimed is:

1. A method of controlling melt flow front pressure in a co-injection molding apparatus, the method comprising:
    during a first injection molding cycle, starting an injection of a first material into a mold cavity at a first injection pressure;
    next, during the first injection molding cycle and in response to determining a first variable is approximately equal to a first threshold value, starting an injection of a second material into the mold cavity at a second injection pressure;
    while injecting the first material into the mold cavity at the first injection pressure, determining, via a first melt pressure sensor disposed near a first injection nozzle, a first flow front pressure, the first flow front pressure corresponding to the first material;
    while injecting the second material into the mold cavity at the second injection pressure, determining, via a second melt pressure sensor disposed near a second injection nozzle, a second flow front pressure, the second flow front pressure corresponding to the second material;
    during the first injection molding cycle, while injecting the first material into the mold cavity, adjusting the first injection pressure to a first constant low pressure based on comparing the first flow front pressure, calculated based on the first melt pressure sensor, to a first optimal flow front pressure;

during the first injection molding cycle, while injecting the second material into the mold cavity, adjusting the second injection pressure to a second constant low pressure based on comparing the second flow front pressure, calculated based on the second melt pressure sensor, to a second optimal flow front pressure;

controlling a ratio of the first flow front pressure and the second flow front pressure;

in response to determining a second variable is approximately equal to a second threshold value, ceasing the injection of the second material into the mold cavity; and in response to determining a third variable is approximately equal to a third threshold value and after ceasing the injection of the second material, ceasing the injection of the first material into the mold cavity, wherein each of the first variable and second variable is one of a group consisting of a flow front pressure, a ratio of flow front pressures, a period of time, a flow front position, a cavity melt pressure, a screw position, and a screw distance travel, and wherein the third variable is one of a group consisting of (i) the first flow front pressure, (ii) the second flow front pressure, and (iii) the ratio of the first flow front pressure and the second flow front pressure.

2. The method of claim 1, further comprising applying a machine learning algorithm to determine the first optimal flow front pressure and the second optimal flow front pressure.

3. The method of claim 1, wherein:
injecting the first material into the mold cavity further comprises injecting the first material into the mold cavity at a first constant low pressure; and
injecting the second material into the mold cavity further comprises injecting the second material into the mold cavity at a second constant low pressure.

4. The method of claim 1, wherein:
determining the first flow front pressure includes measuring the first flow front pressure; and
determining the second flow front pressure includes measuring the second flow front pressure.

5. The method of claim 1, wherein:
determining the first flow front pressure includes determining the first flow front pressure based on a first melt pressure, the first melt pressure corresponding to the first material; and
determining the second flow front pressure includes determining the second flow front pressure based on a second melt pressure, the second melt pressure corresponding to the second material.

6. The method of claim 5, wherein:
determining the first melt pressure includes measuring the first melt pressure; and
determining the second melt pressure includes measuring the second melt pressure.

7. The method of claim 5, wherein:
determining the first melt pressure includes determining the first melt pressure based on the first injection pressure; and
determining the second melt pressure includes determining the second melt pressure based on the second injection pressure.

8. The method of claim 7, wherein:
the first injection pressure is a first hydraulic pressure at a first screw for injecting the first material; and
the second injection pressure is a second hydraulic pressure at a second screw for injecting the second material.

9. The method of claim 1, wherein:
(i) in injecting the first material, the first material is a regrind material,
(ii) in injecting the second material, the second material is a regrind material, or
(iii) in injecting the first and second materials, both the first material is a regrind material and the second material is a regrind material.

10. The method of claim 1, wherein the first optimal flow front pressure has a first value at a first point in time during the first injection molding cycle and the first optimal flow front pressure has a second value at a second point in time during the first injection molding cycle.

11. The method of claim 1, wherein the second optimal flow front pressure has a first value at a first point in time during the first injection molding cycle and the second optimal flow front pressure has a second value at a second point in time during the first injection molding cycle.

12. The method of claim 1, further comprising during a second injection molding cycle subsequent to the first injection molding cycle:
injecting the first material into the mold cavity at a first new injection pressure, wherein the first new injection is based on the adjustment of the first injection pressure; and
injecting the second material into the mold cavity at a second new injection pressure, wherein the second new injection is based on the adjustment of the second injection pressure.

13. The method of claim 1, wherein injecting a first material into a mold cavity and injecting a second material into a mold cavity further comprises:
starting the injection of the first material into the mold cavity;
in response to waiting a predetermined first period of time, starting the injection of the second material into the mold cavity;
in response to waiting a predetermined second period of time, ceasing the injection of the second material into the mold cavity; and
in response to waiting a third predetermined period of time, ceasing the injection of the first material into the mold cavity.

14. The method of claim 1, wherein the first threshold value is a first flow front position setpoint of the first material, a second flow front position setpoint of the second material, a first cavity melt pressure setpoint of the first material, a second cavity melt pressure setpoint of the second material, a first position of a first screw for injecting the first material, a second position of a second screw for injecting the second material, a first distance traveled by the first screw, or a second distance traveled by the second screw.

15. The method of claim 14, wherein
the first cavity melt pressure setpoint of the first material may be measured directly or indirectly; and
the second cavity melt pressure setpoint of the second material may be measured directly or indirectly.

16. The method of claim 15, wherein measuring indirectly further comprises measuring strain using a microwave sensor kit, an x-ray sensor kit, an ultrasonic sensor kits, an air pressure sensor kit, an air temperature sensor kit, or a sub-surface temperature sensor kit.

17. The method of claim 1, wherein:
in determining the first variable is approximately equal to the first threshold value, the first variable is a first non-time-dependent variable;

in determining the second variable is approximately equal to the second threshold value, the second variable is a second non-time-dependent variable; and in determining the third variable is approximately equal to the third threshold value, the third variable is a third non-time-dependent variable.

18. The method of claim 1, wherein:

in determining the first variable is approximately equal to the first threshold value, the first variable is one of a group consisting of (i) the first flow front pressure, (ii) the second flow front pressure, and (iii) the ratio of the first flow front pressure and the second flow front pressure; and in determining the second variable is approximately equal to the second threshold value, the second variable is one of a group consisting of (i) the first flow front pressure, (ii) the second flow front pressure, and (iii) the ratio of the first flow front pressure and the second flow front pressure.

* * * * *